(12) United States Patent
Horikawa et al.

(10) Patent No.: US 8,411,173 B2
(45) Date of Patent: Apr. 2, 2013

(54) BLACK LEVEL CORRECTION CIRCUIT AND SOLID-STATE IMAGING DEVICE

(75) Inventors: Hiroyuki Horikawa, Kanagawa (JP); Hiroki Ui, Tokyo (JP)

(73) Assignee: Sony Corporation, Tokyo (JP)

( * ) Notice: Subject to any disclaimer, the term of this patent is extended or adjusted under 35 U.S.C. 154(b) by 375 days.

(21) Appl. No.: 12/659,784

(22) Filed: Mar. 22, 2010

(65) Prior Publication Data

US 2010/0271514 A1    Oct. 28, 2010

(30) Foreign Application Priority Data

Apr. 24, 2009    (JP) ................. 2009-107138

(51) Int. Cl.
*H04N 9/64*    (2006.01)
(52) U.S. Cl. .................................... 348/243
(58) Field of Classification Search ........... 348/257, 348/241–245; 382/270–273
See application file for complete search history.

(56) References Cited

U.S. PATENT DOCUMENTS 7,423,570 B2    9/2008    Asayama et al.
2004/0189839 A1*    9/2004    McDermott ............. 348/243
2006/0103743 A1*    5/2006    Ono ........................ 348/257
2006/0176519 A1    8/2006    Ouchi
2007/0188640 A1*    8/2007    Xu .......................... 348/308
2008/0048901 A1*    2/2008    Cormier .................. 341/155
2008/0170086 A1*    7/2008    Hatani et al. ........... 345/690
2010/0231762 A1*    9/2010    Shirai et al. ............ 348/243

FOREIGN PATENT DOCUMENTS

JP    2006-222708    8/2006
JP    2007-059991    3/2007

\* cited by examiner

*Primary Examiner* — Aung S Moe
(74) *Attorney, Agent, or Firm* — Rader, Fishman & Grauer PLLC (57) ABSTRACT

A black level correction circuit includes: a counter counting a black signal level of an image; a black level determination section determining a feedback gain by comparing data outputted from the counter with a previously set threshold; an average value calculation section calculating an average value from data supplied from the counter; a feedback calculation processing section selecting the feedback gain by a control signal supplied from the black level determination section and calculating the selected feedback gain and the averaged data; and a digital-analog converter correcting data to which feedback calculation processing has been performed and converting the corrected data into analog data to output an analog black signal.

14 Claims, 7 Drawing Sheets

CLAMP SECTION DATA

BLACK LEVEL CORRECTION CIRCUIT AND SOLID-STATE IMAGING DEVICE

BACKGROUND OF THE INVENTION

1. Field of the Invention

The present invention relates to a black level correction circuit used for a solid-state imaging device and the like, and particularly relates to a clamp circuit correcting blocked up shadows.

2. Description of the Related Art

In a clamp circuit, a black level is maintained to be constant normally by detecting the difference with respect to a target value and feeding back the difference to a DAC (digital-analog converter) section. However, at the time of the detection, there are a case where there are many points having obviously higher level than a target black level in a level in which removal of white points is not performed and a case where part of patterns such as a frame is included in a calculation range. In such cases, the black level in a clamp range becomes higher than the black level in an effective pixel region, which increases a control value to the DAC section more than necessary.

As a result, excessive drawing is performed, and when the black level is displayed in 8-bit (0 to 255), values in the black level which can be originally outputted are fixed to "0", which results in so-called blocked up shadows.

In view of the above, when the black level is fixed to "0", it becomes necessary to check causes and consider the countermeasures, then, to take action such as circuit correction in related art.

In JP-A-2007-059991 (Patent Document 1), an ADC (analog-digital converter) and a DAC (digital-analog converter) in a solid-state imaging device are disclosed, however, a feedback circuit for correcting blocked up shadows is not disclosed. In JP-A-2006-222708 (Patent Document 2), a correction circuit for blocked up shadows in a MOS image sensor mounted on a cellular phone is disclosed, however, there is no description about digital processing for correcting the black level in the feedback circuit and gain switching for adjusting the feedback amount.

SUMMARY OF THE INVENTION

The clamp circuit for correcting the black level has a circuit configuration using a feedback system, and the gain of the DAC is normally set to be constant in the feedback circuit. In this case, when clamping operation is performed in a state in which the black level in a clamp calculation range such as an optical black line becomes higher than the black level in an effective line, drawing processing is performed more than necessary.

As a result, the data level is reduced as a whole, and there may be a case where the dynamic range of the low level is not obtained, resulting in a state of "blocked up shadows".

In such cases, it is necessary check causes of occurrence and to consider the countermeasures. In order to secure the dynamic range in the sensor itself, it is necessary, for example, to change clamp control for preventing the state of blocked up shadows.

Thus, it is desirable to avoid the state of blocked up shadows by controlling the feedback amount as the result of clamp detection with respect to the detection amount for correcting the black level.

According to an embodiment of the invention, there is provided a black level correction circuit including a counter counting a black signal level of an image, a black level determination section determining a feedback gain by comparing data outputted from the counter with a previously set threshold, an average value calculation section calculating an average value from data supplied from the counter, a feedback calculation processing section selecting the feedback gain by a control signal supplied from the black level determination section and calculating the selected feedback gain and the averaged data, and a digital-analog converter correcting data to which feedback calculation processing has been performed and converting the corrected data into analog data to output an analog black signal.

According to another embodiment of the invention, there is provided a solid-state imaging device including a pixel section in which light detection units detecting light signals and converting the lights to electric signals are arranged in a matrix state, and the detected electric signals are outputted by horizontal and vertical drive circuits through column lines, comparators comparing electric signals supplied from the column lines with a ramp waveform to output comparison results, a counter counting a black signal level based on output signals from the comparators, a black level determination section determining a feedback gain by comparing data outputted from the counter with a previously set threshold, an average value calculation section calculating an average value from data supplied from the counter, a feedback calculation processing section selecting the feedback gain by a control signal supplied from the black level determination section and calculating the selected feedback gain and the averaged data, and a digital-analog converter correcting data to which feedback calculation processing has been performed and converting the corrected data into analog data to output an analog black signal.

According to the embodiments of the invention, the control amount of the feedback amount obtained by clamp detection of the black level is reduced with respect to the detection amount as well as the clamp operation is stopped after the feedback is performed once. According to this, the clamp circuit does not perform drawing processing to a degree that causes blocked up shadows and the dynamic range can be secured easily.

DESCRIPTION OF THE PREFERRED EMBODIMENTS

Hereinafter, best modes for carrying out the invention will be explained. The explanation will be made in the following order.

Figure 1A:
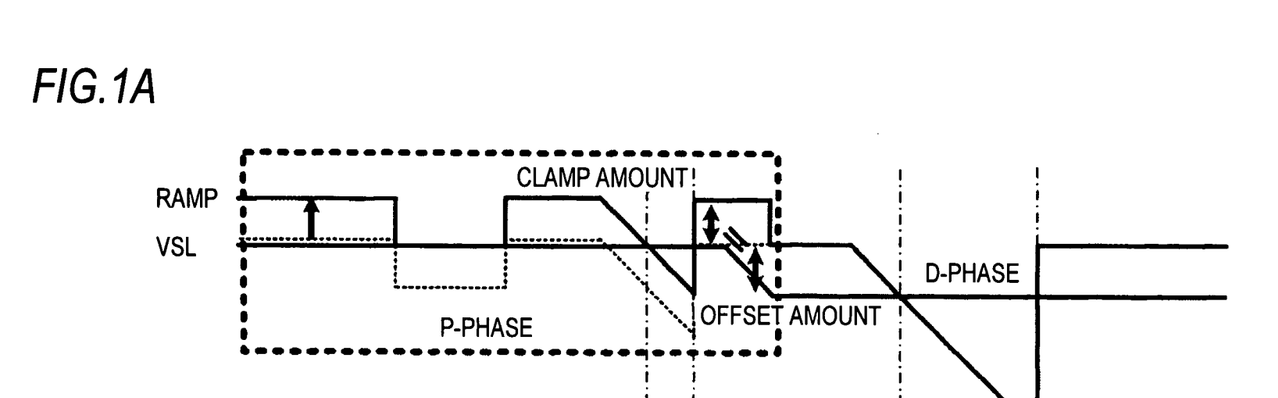
FIG. 1A and FIG. 1B are waveform charts for explaining operations of a solid-state imaging device.
Figure 1B:
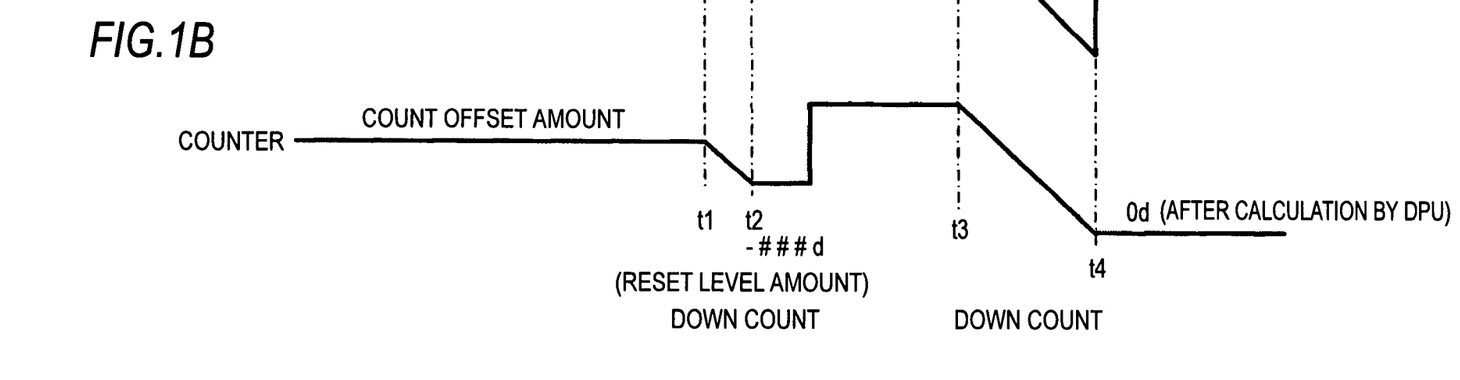

1. Block configuration of a black level correction circuit
2. Specific circuit of a primary circuit in the black level correction circuit 3. Explanation of operations of the black level correction circuit FIG. 1A and FIG. 1B show waveform charts showing operations of a solid-state imaging device. Output waveforms after CDS (Correlated Double Sampling) are shown. A not-shown CDS circuit performs processing of the difference between a precharge phase (P-phase) and a data phase (D-phase) which is an output signal of a pixel with a clamp pulse of sample and hold to form an output signal of a CCD (Charge Coupled Device) waveform.

FIG. 1A shows an example of a Ramp waveform in the P-phase and the D-phase. A region surrounded by a dashed line shows the P-phase, and a Clamp operation concerning the Ramp waveform is started at an intersection of the Ramp waveform and a VSL in the P-phase, namely, at a time point t1.

In FIG. 1B, a down count is performed from the time point t1 to a time point t2 by a Counter (counter), thereby obtaining a value (###d) of a reset level. As shown in FIG. 1A, the VSL level is shifted by the difference between the level of the Ramp waveform and the VSL level at the time point t2 as an offset amount.

In the D-phase, a down count is performed by the counter during a period from a time point t3 to a time point t4 to obtain output data of the pixel. The count value in the D-phase is a level obtained by subtracting a black level value from a value obtained by adding the signal level to the offset value.

1. Block Configuration of a Black Level Correction Circuit

Figure 2:
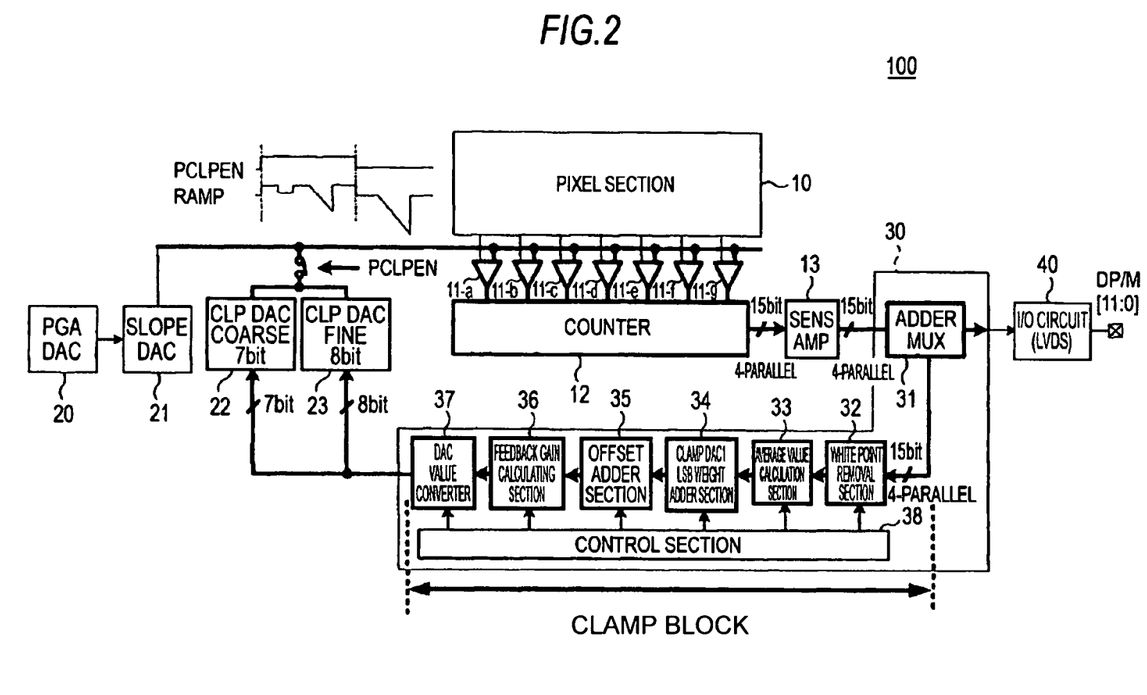
FIG. 2 is a diagram showing a block configuration of a black level correction circuit.

FIG. 2 shows a block configuration of a clamping method, which is a system in which the difference with respect to a target value is detected by a digital circuit and a control value (previous control value+difference) is reflected to a DAC section.

The block of FIG. 2 is configured by a black level correction circuit 100 including a Pixel section having a CCD sensor and a clamp circuit (shown as CLAMP Block in FIG. 2) of a feedback configuration.

In the Pixel section 10, pixel units each having a PD (photodiode), a reading transistor, a transfer transistor and the like are arranged in a matrix state. Signal detected by the pixel units are driven by a horizontal drive circuit and a vertical drive circuit and outputted from column signal lines in synchronization with horizontal and vertical clocks.

The black level correction circuit 100 includes comparators 11-a to 11-g, a Counter (counter) 12, a Sens Amp (sense amplifier) 13, a DPU (calculation processing unit) block 30, an I/O (input/output interface) circuit 40, CLP DAC (clamp DAC) 22, 23, a PGA DAC 20, a Slope DAC 21 and the like.

The DPU Block 30 includes an Adder Mux (adder multiplexer) 31, a white point removal section 32, an average value calculation section 33, a clamp DAC1LSB weight adder section 34, an offset adder section 35, a feedback gain calculation section 36, a DAC value converter 37, and a control section 38.

The block of the clamp circuit (CLAMP Block) corresponds to processing sections other than the Adder Mux 31 in components of the DPU Block 30.

The comparators 11-a to 11-g are formed by differential amplifiers and the like. Respective input terminals of the respective comparators 11-1 to 11-g are connected to column outputs from the Pixel section 10 and an output of the Slope DAC 21 or an output of a switch controlled by PCLPEN respectively, and respective output terminals are connected to the counter 12.

The comparators 11-a to 11-g compares the Slope signal supplied from the Slope DAC 21 or the black-level corrected signal with signals outputted from columns of the Pixel section 10.

The counter 12 is controlled by a not-shown control circuit, performing counting until output data from the comparators 11-a to 11-g is inverted to output data of, for example, 15-bit, 4-parallel data in response to the count value.

Sens Amp (sense amplifier) 13 amplifies data outputted from the counter 12 and outputs 15-bit, 4-parallel data.

The Adder Mux (adder multiplexer) 31 outputs 15-bit, 4-parralel data outputted from the sense amplifier 13 to the I/O(LVDS) circuit 40 as well as outputs 15-bit, 4-parralal data to the white point removal section 32.

An input terminal of the white point removal section 32 is connected to a second output terminal of the Adder Mux 31, an output terminal thereof is connected to an input terminal of the average value calculation section 33, and a control terminal thereof is connected to an output of the control section 38.

A threshold is provided in the while point removal section 32, which is operated in accordance with a control signal from the control section 38. The white point removal section 32 removes data, for example, when inputted white point data is more than the previously set threshold. The white point removal point 32 removes white points having the level more than the threshold included in the inputted black level signal and extracts a more accurate black point level.

The input terminal of the average value calculation section 33 is connected to the output terminal of the white point removal point 32, an output terminal thereof is connected to an input terminal of the clamp DAC1LSB weight adder section 34 and a control terminal thereof is connected to an output terminal of the control section 38.

An average value calculation section 33 is operated in accordance with a control signal of the control section 38 and averages the inputted black point level. The detailed configuration of the average value calculation section 33 will be described later.

The input terminal of the clamp DAC1LSB weight adder section 34 is connected to the output terminal of the average value calculation section 33, an output terminal thereof is connected to an input terminal of the offset adder section 35 and a control terminal thereof is connected to an output terminal of the control section 38.

The clamp DAC1LSB weight adder section 34 includes a not-shown Clp Add (clamp adder) section and a clamp DAC1LSB weight correction section.

In the Clp Add section, 15-bit 4-parallel data is inputted and 31-bit data is outputted, and further, 31-bit data is averaged and 18-bit data is derived.

The clamp DAC1LSB weight correction section changes 1LSB (Least Significant Bit) weight with respect to the data averaged in the Clp add section and output the data.

The input terminal of the offset adder section 35 is connected to the output terminal of the clamp DAC1LSB weight correction section in the clamp DAC1LSB weight adder section 34, an output terminal thereof is connected to an input terminal of the feedback gain calculation section 36 and a control terminal thereof is connected to an output terminal of the control section 38.

The offset adder section 35 adds an offset value to 18-bit data inputted from the clamp DAC1LSB weight adder section 34 and output 19-bit data.

The input terminal of the feedback gain calculation section 36 is connected to the output terminal the offset adder section 35, an output terminal thereof is connected to an input terminal of the DAC value converter 37, and a control terminal thereof is connected to an output terminal of the control section 38.

The feedback gain calculation section 36 compares the inputted black level signal with the threshold by a not-shown black level determination section included in, for example, a DSP, setting a gain for determining the feedback amount.

As gain examples, there are ×1.0, ×0.85, ×0.5 and ×0.25, and one of these gains is selected by a control signal corresponding to the result determined by the black level determination section. The selected gain and the black level signal to which the offset is added is calculated, for example, multiplied to be outputted as a new feedback amount.

The input terminal of the DAC value converter 37 is connected to the output terminal of the feedback gain calculation section 36, an output terminal thereof is connected to input terminals of the CLP DAC Coarse 22 and the CLP DAC Fine 23 and a control terminal thereof is connected to an output terminal of the control section 38.

The DAC value converter 37 performs raising processing with respect to CLP DAC Coarse 22 and performs calculation processing of the control value with respect to the CLP DAC Fine 23.

The output terminals of the control section 38 are connected to respective control terminals of the above white point removal section 32, the average value calculation section 33, the clamp DAC1LSB weight adder section 34, the offset adder section 35, the feedback gain calculation section 36 and the DAC value converter 37, and the control section 38 outputs control signals to respective sections.

The data supplied from the DAC value converter 37 is inputted to the two DAC connected in parallel, where a digital signal is converted into an analog signal.

The input terminal of the CLP DAC Coarse 22 is connected to the output terminal of the DAC value converter 37, and an output terminal thereof is connected to one on terminals of the switch of the PCLPEN.

The CLP DAC Fine 23 is connected to the CLP DAC Coarse 22 in parallel, the input terminal thereof is connected to the output terminal of the DAC value converter 37 and an output terminal thereof is connected to one of terminals of the switch of the PCLPEN.

In DA conversion, when data to which processing of calculating a DAC control value has been performed is inputted from the DAC value converter 37, first, 7-bit DA conversion is performed in the CLP DAC Coarse 22, and next, 8-bit DA conversion is performed in the CLP DAC Fine 23. As a result, an analog signal (voltage) in 15-bit accuracy in total is outputted as a level-corrected black signal in the DA conversion.

The two DAC includes the CLP DAC Coarse 22 (coarse) and the CLP DAC Fine (fine) 23, which improves conversion accuracy of the black level.

The other terminal of the switch is connected to an output terminal of the Slope DAC 21 and respective input terminals of the comparators 11-$a$ to 11-$g$.

The output terminal of the Slope DAC 21 is connected to respective input terminals of the comparators 11-$a$ to 11-$g$, outputting a slope signal, for example, a signal having a ramp waveform in accordance with a synchronization signal.

Next, a circuit configuration example of a primary block constituting the clamp circuit will be explained.

Figure 3:
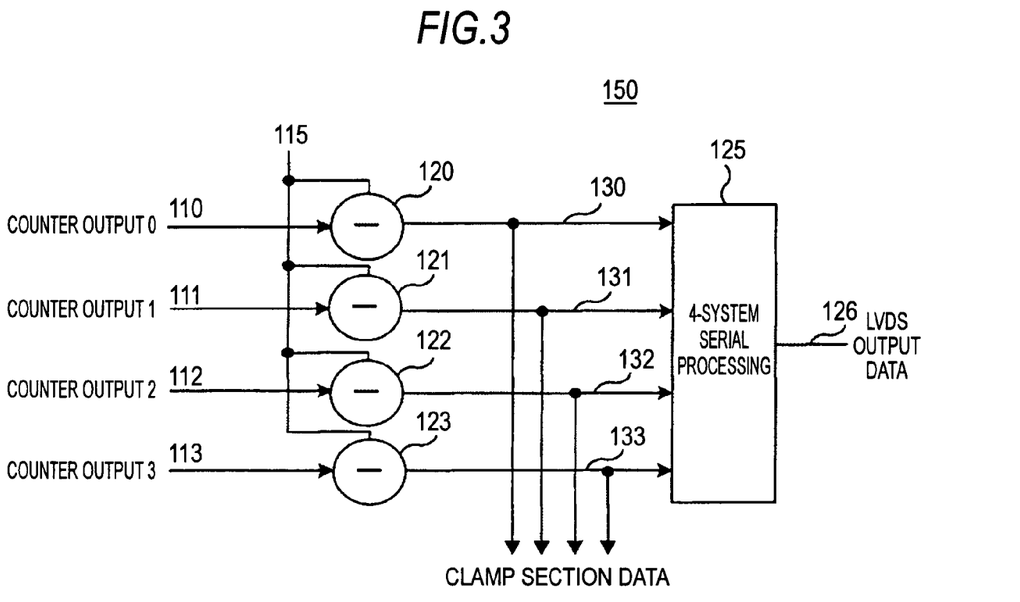
FIG. 3 is a diagram showing a circuit configuration of a digital converter in an adder and a multiplexer.

2. Specific Circuit of the Primary Circuit in the Black Level Correction Circuit FIG. 3 shows a specific circuit configuration of the Adder Mux 31 having a digital data converter and a multiplexer.

An output terminal 110 of the counter 12 is connected to a first input terminal of a subtracter 120, data of offset subtraction is supplied to a second input terminal of the subtracter 120 from the counter 12, and an output terminal 130 is connected to a first input terminal of a 4-system serial processing circuit 125. The output terminal 130 is connected to the clamp block (CLAMP Block).

An output terminal 111 of the counter 12 is connected to a first input terminal of a subtracter 121, data of offset subtraction is supplied to a second input terminal of the subtracter 121 from the counter 12, and an output terminal 131 is connected to a second input terminal of the 4-system serial processing circuit 125. The output terminal 131 is also connected to the clamp block (CLAMP Block).

An output terminal 112 of the counter 12 is connected to a first input terminal of a subtracter 122, data of offset subtraction is supplied to a second input terminal of the subtracter 122 from the counter 12, and an output terminal 132 is connected to a third input terminal of the 4-system serial processing circuit 125. The output terminal 132 is also connected to the clamp block (CLAMP Block).

An output terminal 113 of the counter 12 is connected to a first input terminal of a subtracter 123, data of offset subtraction is supplied to a second input terminal of the subtracter 123 from the counter 12, and an output terminal 133 is connected to a fourth input terminal of the 4-system serial processing circuit 125. The output terminal 133 is also connected to the clamp block (CLAMP Block).

In response to count values obtained in the counter 12, for example, subtraction processing is performed to 15-bit, 4-parallel data and offset data supplied from the counter 12 in the subtracters 120 to 123, and LVDS (output) data is outputted from the 4-system serial circuit 125.

The respective clamp data to which the subtraction processing has been performed is outputted to the white point removal section 32 in the clamp block.

Figure 4:
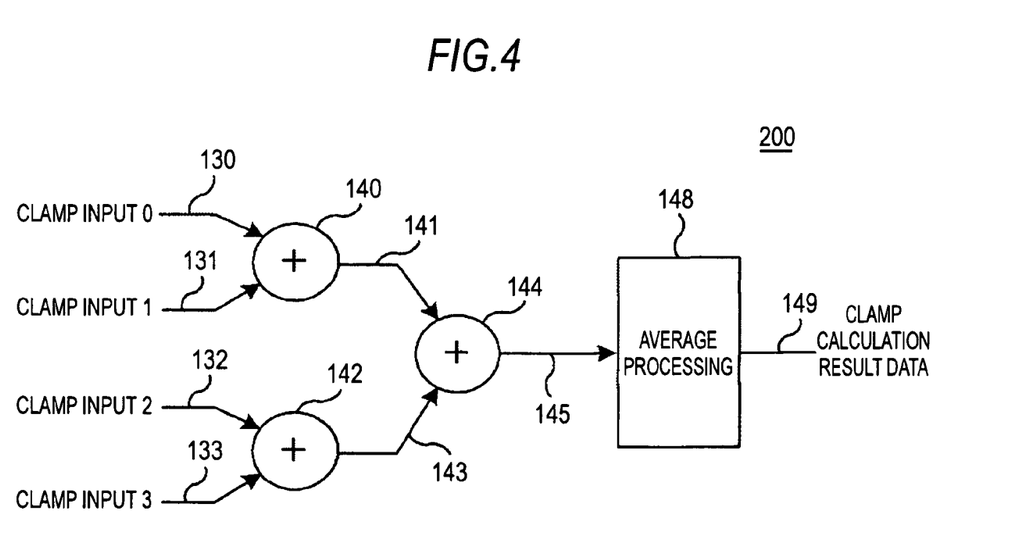
FIG. 4 is a diagram showing a circuit configuration of an average value calculation section.

FIG. 4 shows a specific circuit configuration of the average value calculation section 33.

The input terminal 130 to which data of a clamp input "0" is inputted is connected to a first input terminal of an adder 140 and the input terminal 131 to which data of a clamp input 1 is inputted is connected to a second input terminal of the adder 140. An output terminal 141 of the adder 140 is connected to a first input terminal of an adder 144.

The input terminal 132 to which data of a clamp input 2 is inputted is connected to a first input terminal of an adder 142 and the input terminal 133 to which data of a clamp input 3 is inputted is connected to a second input terminal of the adder 142. An output terminal 143 of the adder 142 is connected to a second input terminal of the adder 144.

An output terminal 145 of the adder 144 is connected to an input terminal of an average processing circuit 148, and a clamp calculation result is outputted from an output terminal 149 of the average processing circuit.

The clamp data inputted from the input terminals 130 to 131 is added by the adder 140 and clamp data inputted from the input terminals 132 to 133 is added by the adder 142. The added data outputted from the adders 140, 142 is inputted to the adder 144, where adding processing is performed and the processed result is supplied to the average processing circuit 148. The average processing is performed in the average processing circuit 148 and the result is outputted as clamp calculation data.

Figure 5:
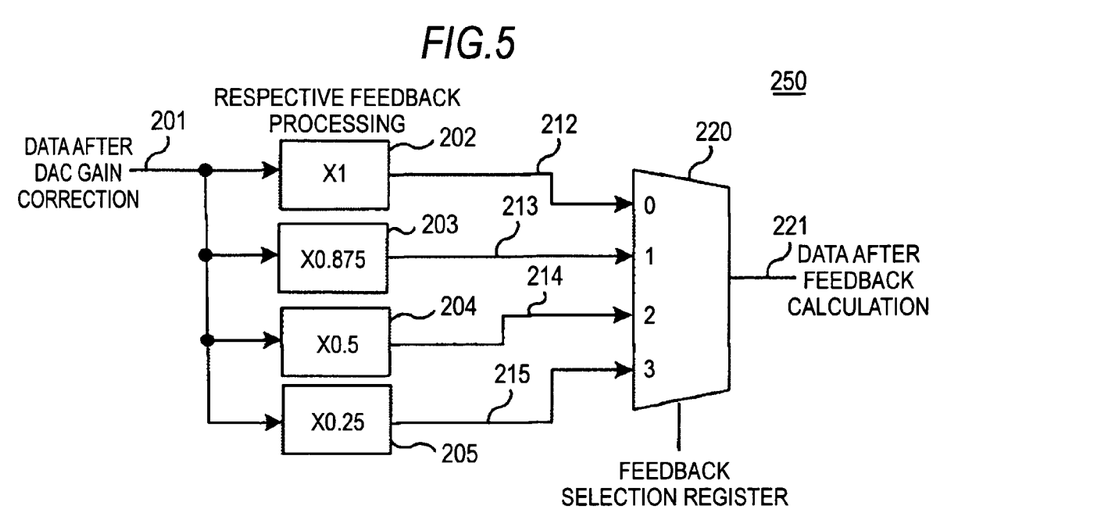
FIG. 5 is a diagram showing a circuit configuration of a feedback gain calculation section.

FIG. 5 is a specific circuit configuration of the feedback gain calculation section 36.

A terminal 201 to which data after DAC gain correction is supplied is connected to respective input terminals of respective feedback processing circuit 202 to 205.

An output terminal 212 of the feedback processing circuit 202 is connected to a first input terminal of a selector 220 and an output terminal 213 of the feedback processing circuit 203 is connected to a second input terminal of the selector 220. An output terminal 214 of the feedback processing circuit 204 is connected to a third input terminal of the selector 220, and an output terminal 215 of the feedback processing circuit 205 is connected to a fourth input terminal of the selector 220. Additionally, a fifth input terminal of the selector 220 is connected to a feedback selection register.

Data after the DAC gain correction is inputted to respective feedback processing circuits 202 to 205. Data after the DAC gain correction is multiplied by 1.0, namely, data without any change is outputted to the selector 220 in the feedback processing circuit 202. In the feedback processing circuit 203, data after the DAC gain correction is multiplied by 0.875 to be outputted to the selector 220. In the feedback processing circuit 204, data after the DAC gain correction is multiplied by 0.5 to be outputted to the selector 220. In the feedback processing circuit 205, the data after the DAC gain correction is multiplied by 0.25 to be outputted to the selector 220.

The gain is determined by the black level determination section which compares the black level with the predetermined threshold, and the control signal controlling the selector 220 is set based on the determination result. The control signal corresponding to the set gain is stored in the above feedback selection resistor.

The control signal of gain selection is supplied to the fifth input terminal (control terminal) of the selector 220 from the feedback selection resister, any of numerals 0 to 3 shown in the selector 220 of FIG. 5 is selected, and input data corresponding to the selected numeral is outputted from the selector 220.

Figure 6:
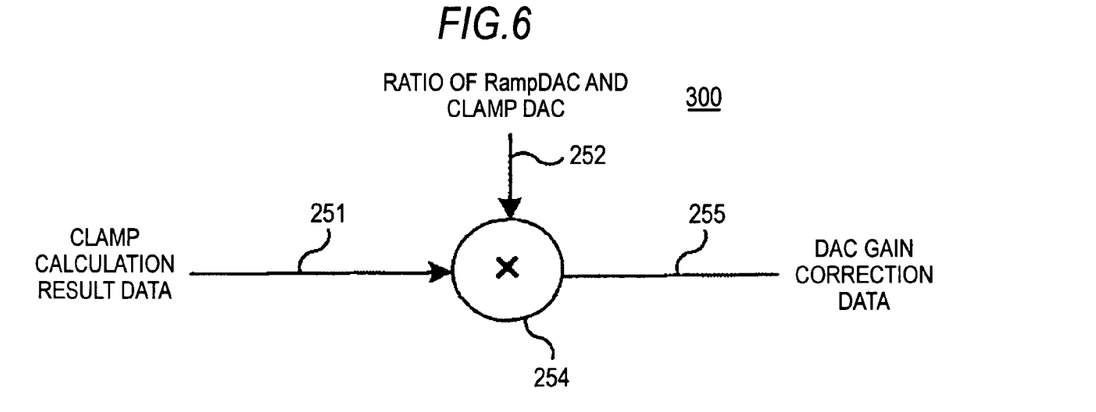
FIG. 6 is a diagram showing a circuit configuration performing DAC gain correction of in clamping.

FIG. 6 shows a schematic view of the DAC gain correction in the clamping.

An input terminal 251 to which data obtained by clamp calculation is supplied is connected to a first input terminal of a multiplier 254, and a second input terminal of the multiplier 254 is connected to a terminal 252 to which data indicating the ratio of the RampDAC and the clamp DAC is supplied.

The clamp-calculated data and data indicating the ratio of RampDAC and the clamp DAC are multiplied at the multiplier 254, and the multiplied result is outputted from the multiplier 254 as DAC gain correction data.

Figure 7:
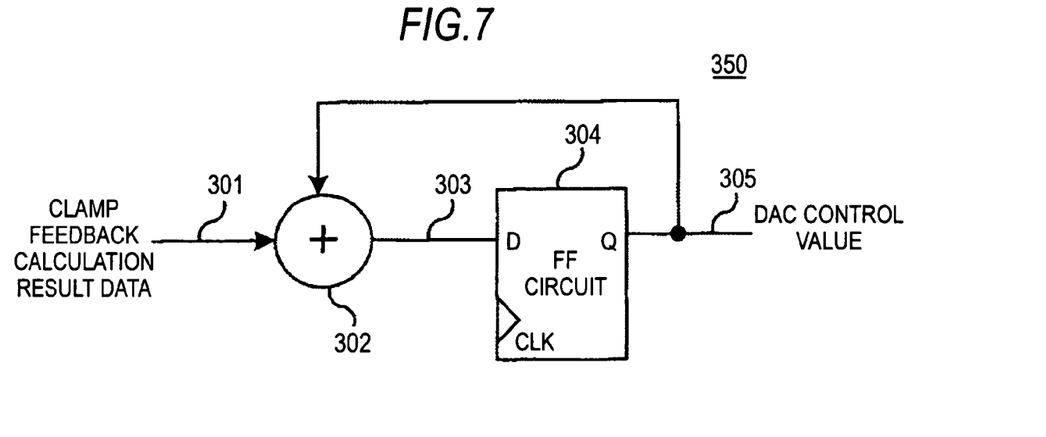
FIG. 7 is a diagram showing a circuit configuration of a DAC control unit.

FIG. 7 shows a schematic configuration view of the DAC (control) value converter 37.

A terminal 301 to which data obtained as a calculation result by the clamp feedback calculation is supplied is connected to a first input terminal of an adder 302, and an output terminal 303 of the adder 302 is connected to an input terminal D of a FF (flip-flop) circuit 304. A Q-output terminal 305 of the FF circuit 304 is connected to an output terminal which outputs a DAC control value and a second input terminal of the adder 302.

In the DAC value converter 37, data obtained as a result of clamp feedback calculation and output data of the FF circuit 304 delayed by 1 clock are added, and the added data is inputted to the FF circuit 304 in synchronization with a clock. The inputted data is outputted from the Q-output terminal 305 of the FF circuit 304 in synchronization with a next clock and outputted to the CLP DAC Coarse 22 and the CLP DAC Fine 23 as the DAC control value, which is repeated a given number of times.

According to respective circuits configured above, the average value calculation processing, the feedback gain calculation processing, the DAC value conversion processing and the like are performed.

3. Explanation of Operations of the Black Level Correction Circuit

Figure 8:
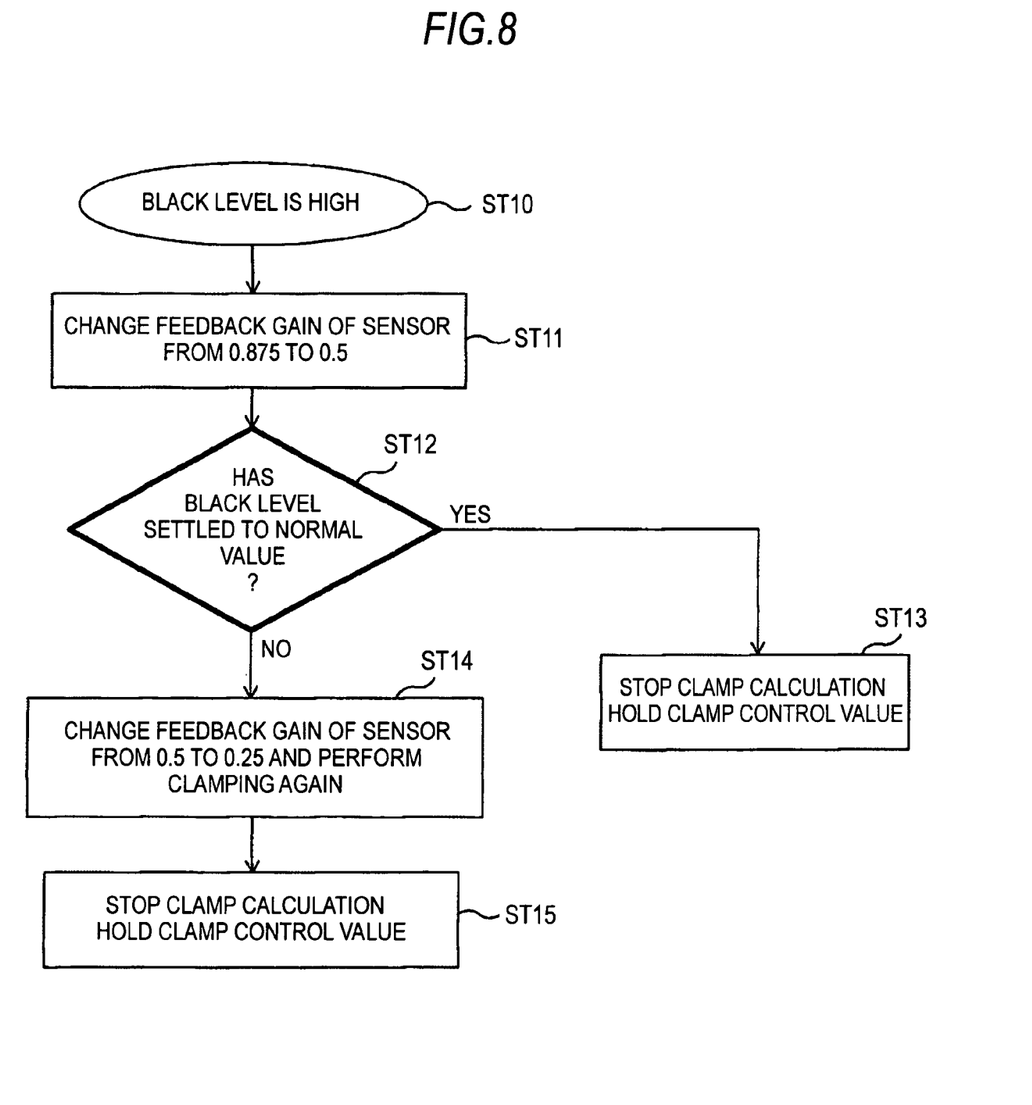
FIG. 8 is a flowchart for explaining a clamp operation.

Next, operations of the black level correction circuit 100 shown in FIG. 2 will be explained by using a flowchart shown in FIG. 8 and waveform charts shown in FIG. 9A, 9B and FIG. 10A to 10B. Here, correction operations of the black level in the P-phase will be explained. Since operations in the D-phase are the same as operations in related art, they will be simply explained.

The black level signal read from the Pixel section 10 is supplied to the comparators 11-$a$ to 11-$g$ through column signal lines, and the supplied signal is compared with the RAMP waveform supplied from the CLP DAC Fine 23.

The counter 12 makes a measurement for a period from a time when a given period of time has passed with respect to a synchronized signal until output signals from the comparators 11-$a$ to 11-$g$ are inverted in respective columns, outputting 4-parallel 15-bit data to the sense amplifier 13 based on the count value obtained when the output signals are inverted.

The 15-bit 4-parallel data amplified at the sense amplifier 13 is supplied to the clamp block (CLAMP Block) by the multiplex operation by the Adder Mux 31.

The 15-bit data inputted to the white point removal section 32 is compared with the threshold which has been previously set in the white point removal section 32, and white point data higher than the threshold is removed as a result of comparison. After the white point data from which white points are removed and black level data other than the white point data is added to the clamp value in the adder, the result is outputted to the average value calculation section 33, where the average value processing is performed in the average value calculation section 33.

In the clamp DAC1LSB weight adder section 34, for example, the inputted data is uniformly multiplied by 3 in the DAC1LSB weight correction, and further, the offset value is added to the data to which weight correction has been performed in the offset value adder section.

The black level signal to which the offset is added is supplied to the feedback gain calculation section 36, and the result of the gain determined in accordance with the black level value in the black level determination circuit is also supplied thereto. According to the determination result, the optimum gain (coefficient) is selected from feedback gains of ×1.0, ×0.85, ×0.5 and ×0.25. The feedback gains are not limited to these values and various values can be applied as long as they are suitable for the clamp operation. Additionally, four gain coefficients are shown here, however, the number of gain coefficients is not limited to this, and the optional number can be set.

Next, operations of the feedback gain calculation section 36 will be explained by using a flowchart shown in FIG. 8.

Step ST10: Assume that the black level is higher than an effective line level.

Step ST11: Data of the black level is compared with the threshold and which coefficient should be selected from feedback gain coefficients is determined, and the feedback gain of the sensor is changed from ×0.875 to ×0.5 according to the determination result.

Data to which the offset is added is calculated by using the selected gain of ×0.5, then, the analog gain correction and the offset correction are performed. The raising processing or calculation of a control value is performed in the DAC value converter 37, and the digital data is converted to the analog voltage in the CLP DAC Coarse 22 or the CLP DAC Fine 23.

The converted voltage is inputted to the comparators 11-$a$ to 11-$g$ through the SW (switch) which is set to ON-state by the control signal of PCLPEN.

The count value corresponding to the comparison result in the comparators 11-a to 11-g is obtained in the counter 12, and the result is supplied to the black level determination section in the DSP through the sense amplifier 13, the Adder Mux 31, the I/O (LVDS) circuit 40.

Step ST12: Whether the black level is within the range of normal values or not is determined in the black level determination section, and when the determination result is "Yes", the process proceeds to Step ST13, and when the determination result is "No", the process proceeds to Step ST14.

Step ST13: When the black level as the determination result in the black level determination section is within the normal range, the calculation operation in the feedback gain calculation section 36 is stopped as well as the clamp control value is held by setting the feedback gain (gain coefficient) to be ×0.5.

Step ST14: As the result of determination of the black level, when the black level is not within the normal range, the feedback gain is changed from ×0.5 to ×0.25 by the black determination unit, and the clamp operation is performed again as described above.

Step ST15: Then, the calculation operation of the feedback gain calculation section 36 is stopped as well as the clamp control value is held by setting the feedback gain (gain coefficient) to be ×0.25, and the process proceeds to image processing of effective lines.

Next, after the black level is corrected in the above clamp operation, signal processing is performed in the D-phase.

The signals outputted from the Pixel section 10 are supplied to the comparators 11-a to 11-g through column signal lines, and the supplied signals are compared with the slope signal supplied from the Slope DAC 21. The counter 12 makes a measurement for a period from a time when a given period of time has passed with respect to a synchronized signal until output signals from the comparators 11-a to 11-g are inverted, outputting 4-parallel 15-bit data to the sense amplifier 13 based on the count value obtained when the output signals are inverted. Pixel signals outputted from the sense amplifier 13 are supplied to the I/O (LVDS) 40 through the Adder Mux 31, and image data of 12-Bit is outputted.

In the digital section, data within the range previously set is added and averaged, the gain correction of the DAC is performed, then, the result of feedback gain calculation is reflected on the control value of the DAC value converter and outputted to the DAC section (CLP DAC Coarse 22, CLP DAC Fine 23).

Normally, the clamp calculation range is set in an optical black line to adjust the black level. The series of operation loop is repeated several times to realize convergence to the target black level without oscillation.

In the case where the signal level in the optical black (VOPB) line is increased, the control value to the DAC section is increased more than necessary, then, the increased amount is drawn into the DAC section to adjust the level. As a result, the whole signal level is reduced, resulting in blocked up shadows. There is a case where the block level which can be outputted normally is fixed to "0", which may reduce the D (dynamic) range.

Next, operations when the clamp circuit according to an embodiment of the invention is turned on/off will be explained with reference to FIG. 9A, FIG. 9B and FIG. 10A to FIG. 10C.

Figure 9A:
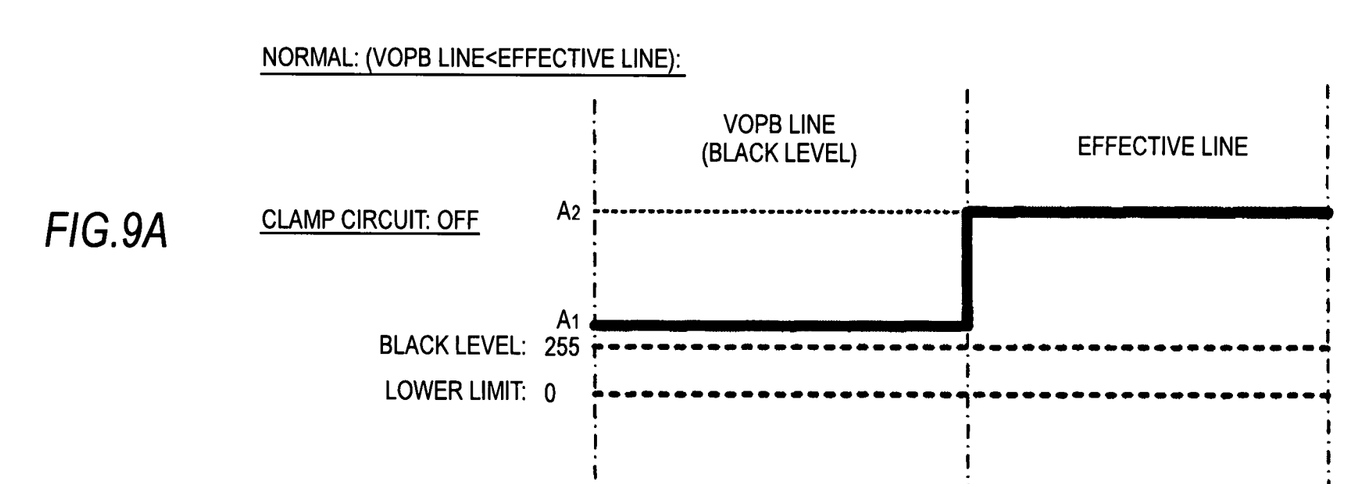
FIG. 9A and FIG. 9B are waveform charts for explaining a normal clamp operation.
Figure 9B:
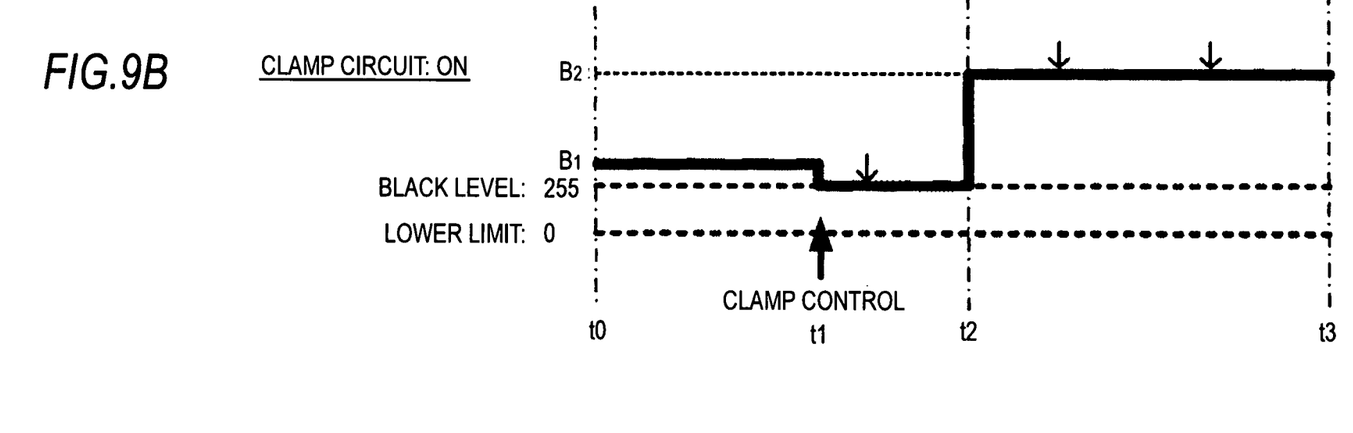
Figure 10A:
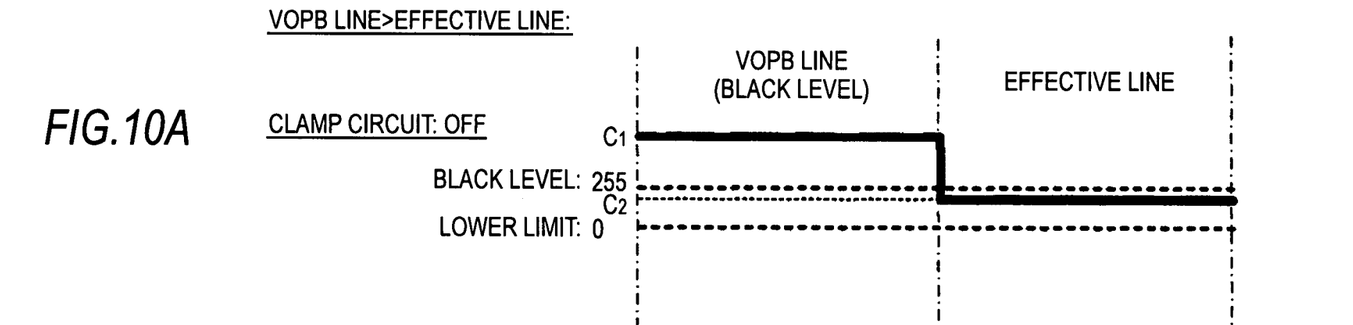
FIG. 10A to FIG. 10C are waveform charts for explaining a clamp operation performed when the level in a VOPB line is higher than the level in an effective line.
Figure 10B:
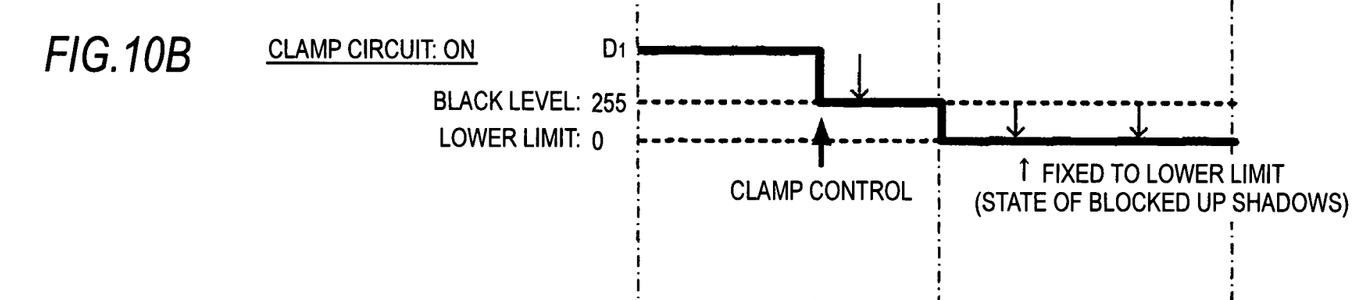
Figure 10C:
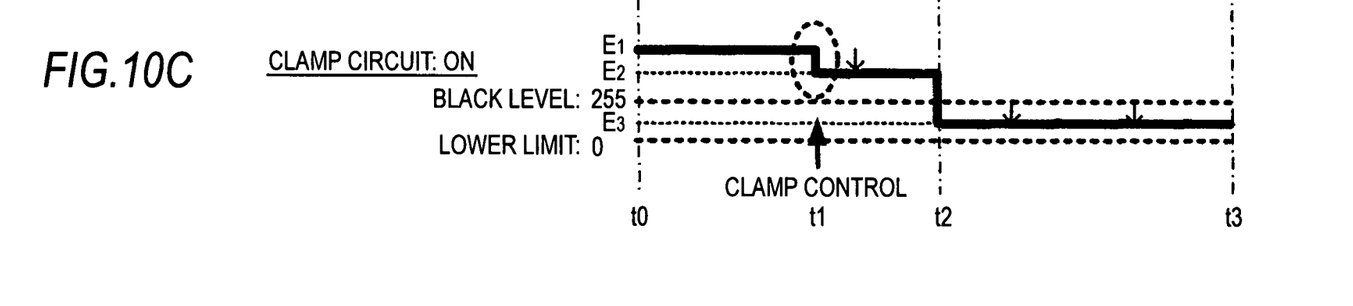

FIG. 9A and FIG. 9B show operation examples of clamp operations in the case of "normal operation VOPB (V-optical black)<effective line", FIG. 10A to FIG. 10C show operation examples in the case of "VOPB>effective line level".

In these waveform charts, the black level is expressed in 8-bit, that is, the level is defined to be "0" to "255", in which the lower limit is "0".

FIG. 9A shows a signal waveform when the clamp circuit is in OFF-state in the case of "VOPB<effective (line) level".

The black level of the VOPB line is at a fixed level (A1) from a time point t0 to a time point t2, and a black level A2 of an image of an effective line during a period from the time point t2 to a time point t3 is shown. In this case, the clamp circuit is stopped, therefore, the clamp value of the black level during a period from the time point t1 at which the operation of clamp control is started to the time point t2 is the same as the black level during a period from the time point t0 to the time point t1 which is the period before start of the clamp operation.

FIG. 9B shows a signal waveform when the clamp circuit is in ON-state.

The black level of the VOPB line is at a fixed level (B1) from a time point t0 to a time point t1. The above-described clamp control operation is performed at the time period t1, where the black level is clamped at a value of "255". The clamped black level is maintained until the time point t2.

The clamp value of the black level in the effective line from the time point t2 to the time point t3 is level B2. During the period from the time point t2 to the time point t3, the clamp value of the black level is reduced (shifted) from the value before correction by the corrected amount of the black level at the time point t1. In the chart, downward arrows represent the situation in order to allow the situation to be visually comprehensive.

That is, in the case of "VOPB (V-optical black)<effective line", the feedback amount by the clamp operation is small and the clamp value of the black level in the effective line does not become "0", therefore, the state of blocked up shadows is not generated.

FIG. 10A shows a signal waveform when the clamp circuit is in OFF-state in the case of "VOPB>effective line level".

The black level of the VOPB line is at a fixed level (C1) from a time point t0 to a time point t2, and the black level of the image in the effective line having a value lower than the black level in the VOPB before the time point t2 is shown. As a specific example in this case, the black level in the effective line indicates a given value C2 between black levels 255 to "0".

In this case, the clamp circuit is stopped in the same manner as the above case, therefore, the black level during a period from the time point t1 at which the operation of clamp control is started to the time point t2 is the same as the black level C1 during a period from the time point t0 to the time point t1 which is before the start of the clamp operation.

FIG. 10B shows a signal waveform obtained when the clamp circuit is in ON-state.

The black level of the VOPB line is at a fixed level (D1) from a time point t0 to a time point t1, and the above-described clamp control operation is performed at the time period t1, where the black level is clamped at a value of "255".

At the time of the clamp, the feedback gain is determined at the above-described black level determination section. Assume that the gain value of ×0.5 is set as the determination result. After that, the black level is calculated by using the selected gain of ×0.5 at the feedback gain calculation section 36, and the DAC value conversion processing and the DA conversion processing at the CLP DAC Fine 23 are performed to the calculation result to be supplied to the comparators 11-a to 11-g. At the same time as these processing, the black level is maintained.

The clamped black level "255" is maintained until the time point t2. The black level in the effective line during a period from the time point t2 to the time point t3 is shown. During the period from the time point t2 to the time point t3, the black level is reduced (shifted) from the value before correction by the corrected amount of the black level at the time point t1 (level D1-level 255). Downward arrows represent, the situation in order to allow the situation to be visually comprehensive.

That is, in the case of "VOPB (V-optical black)>effective line" as well as when the feedback gain is large, the feedback amount by the clamp operation is large and the black level of the effective line is fixed to the lower limit of "0", resulting in blocked up shadows.

FIG. 10C shows a signal waveform obtained when the clamp circuit is ON and the feedback gain is further reduced.

The black level of the VOPB line is at a fixed level (E1) from a time point t0 to a time point t1, and the above-described clamp control operation is performed at the time period t1, where the black level is clamped at a level E2 which is higher than the black level "255".

At the time of the clamp, the gain is determined at the above-described black level determination section. Assume that the feedback gain value of ×0.25 is set as the determination result. After that, the black level is calculated by using the selected gain of ×0.25 at the feedback gain calculation section 36, and the calculation result is supplied to the comparators 11-a to 11-g through the DAC value converter 37 and the CLP DAC Fine 23. At the same time as these processing, the black level is maintained. This clamp operation is performed only once.

The clamped level E2 is maintained until the time period t2. A black level E3 in the effective line during a period from the time period t2 to the time period t3 is shown. During the period from the time point t2 to the time point t3, the black level is reduced (shifted) from the value before correction by the corrected amount of the black level at the time point t1 (level E1-level E2). Downward arrows represent the situation in order to allow the situation to be visually comprehensive.

That is, in the case of "VOPB (V-optical black)>effective line", the feedback amount by the clamp operation is adjusted to select the optimum gain, therefore, the black level in the effective line is not fixed to the lower limit of the black level "0", therefore, the state of blocked up shadows is not generated. It is also possible to avoid the state of blocked up shadows by the simple control change, that is, the clamp calculation is performed only once.

When the clamp operation is performed in a state in which the black level within the clamp calculation range such as the optical black line is higher than the black level in the effective line, drawing processing is performed more than necessary and the data level is reduced as a whole, as a result, there may be a case in which it is difficult to secure the dynamic range of the low level.

However, in order to secure the dynamic range of the sensor itself, the feedback amount of the clamp detection result is reduced to, for example, a half or ¼ of the detection amount by changing the control of clamp to a small degree, and the clamping operation is stopped after, the feedback is performed once. Accordingly, in the black level correction circuit, the drawing processing is not performed more than necessary, therefore, the so-called blocked up shadows are not generated and the dynamic range can be secured easily.

In the embodiment of the invention, the counter which counts the black signal level of the image corresponds to the Counter 12. The black level determination section which compares the data outputted from the counter with the previously set threshold to determine the feedback gain corresponds to the black level determination section included in the not shown DSP and the like. The average value calculation section which calculates the average value from data supplied from the counter corresponds to the average value calculation section 33. The feedback calculation section which selects the feedback gain by the control signal supplied from the black level determination section and calculates the selected feedback gain and the averaged data corresponds to the feedback gain calculation section 36. The digital-analog converter which corrects data to which feedback calculation processing has been performed and converts the corrected data into analog data to output the analog black signal corresponds to the CLP DAC Coarse 22 and the CLP DAC Fine 23.

The present application contains subject matter related to that disclosed in Japanese Priority Patent Application JP 2009-107138 filed in the Japan Patent Office on Apr. 24, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A black level correction circuit comprising:
a counter counting a black signal level of an image;
a black level determination section determining a feedback gain by comparing data outputted from the counter with a previously set threshold;
an average value calculation section calculating an average value from data supplied from the counter;
a feedback calculation processing section selecting the feedback gain by a control signal supplied from the black level determination section and calculating the selected feedback gain and the averaged data; and
a digital-analog converter correcting data to which feedback calculation processing has been performed and converting the corrected data into analog data to output an analog black signal.

2. The black level correction circuit according to claim 1, wherein the black level correction circuit operates in a black level detection period.

3. The black level correction circuit according to claim 1, wherein the number of times the feedback calculation is performed in the feedback calculation processing section is once.

4. The black level correction circuit according to claim 1, further comprising:
a white point removal section removing white point data which is higher than a threshold in data supplied from the counter and outputted to the average value calculation section.

5. The black level correction circuit according to claim 1, wherein data outputted from the counter output has 4-parallel digital data, which is averaged in the average value calculation section by using the data.

6. The black level correction circuit according to claim 1, wherein plural number of feedback gains is included, and a selector selecting the feedback gain by the control signal supplied from the black level determination section is included.

7. The black level correction circuit according to claim 6, wherein a smaller feedback gain value is selected when the black signal level in the black level detection period is lower than the black signal level in a video detection period.

8. The black level correction circuit according to claim 7, wherein the feedback gain values are 1.0, 0.875, 0.5 and 0.25.

9. A solid-state imaging device comprising:
a pixel section in which light detection units detecting light signals and converting the lights into electric signals are arranged in a matrix state, and the detected electric signals are outputted by horizontal and vertical drive circuits through column lines;
comparators comparing electric signals supplied from the column lines with a ramp waveform to output comparison results;
a counter counting a black signal level based on output signals from the comparators;
a black level determination section determining a feedback gain by comparing data outputted from the counter with a previously set threshold;
an average value calculation section calculating an average value from data supplied from the counter;
a feedback calculation processing section selecting the feedback gain by a control signal supplied from the black level determination section and calculating the selected feedback gain and the averaged data; and
a digital-analog converter correcting data to which feedback calculation processing has been performed and converting the corrected data into analog data to output an analog black signal.

10. The solid-state imaging device according to claim 9, wherein the black level correction circuit operates in a black level detection period.

11. The solid-state imaging device according to claim 9, wherein the number of times the feedback calculation is performed in the feedback calculation processing section is once.

12. The solid-state imaging device according to claim 9, further comprising:
a white point removal section removing white point data which is higher than a threshold in data supplied from the counter and outputted to the average value calculation section.

13. The solid-state imaging device according to claim 12, wherein plural number of feedback gains is included, and
a selector selecting the feedback gain by the control signal supplied from the black level determination section is included.

14. The solid-state imaging device according to claim 9, wherein data outputted from the counter output has 4-parallel digital data, which is averaged in the average value calculation section by using the data.

* * * * *